Figure 1:
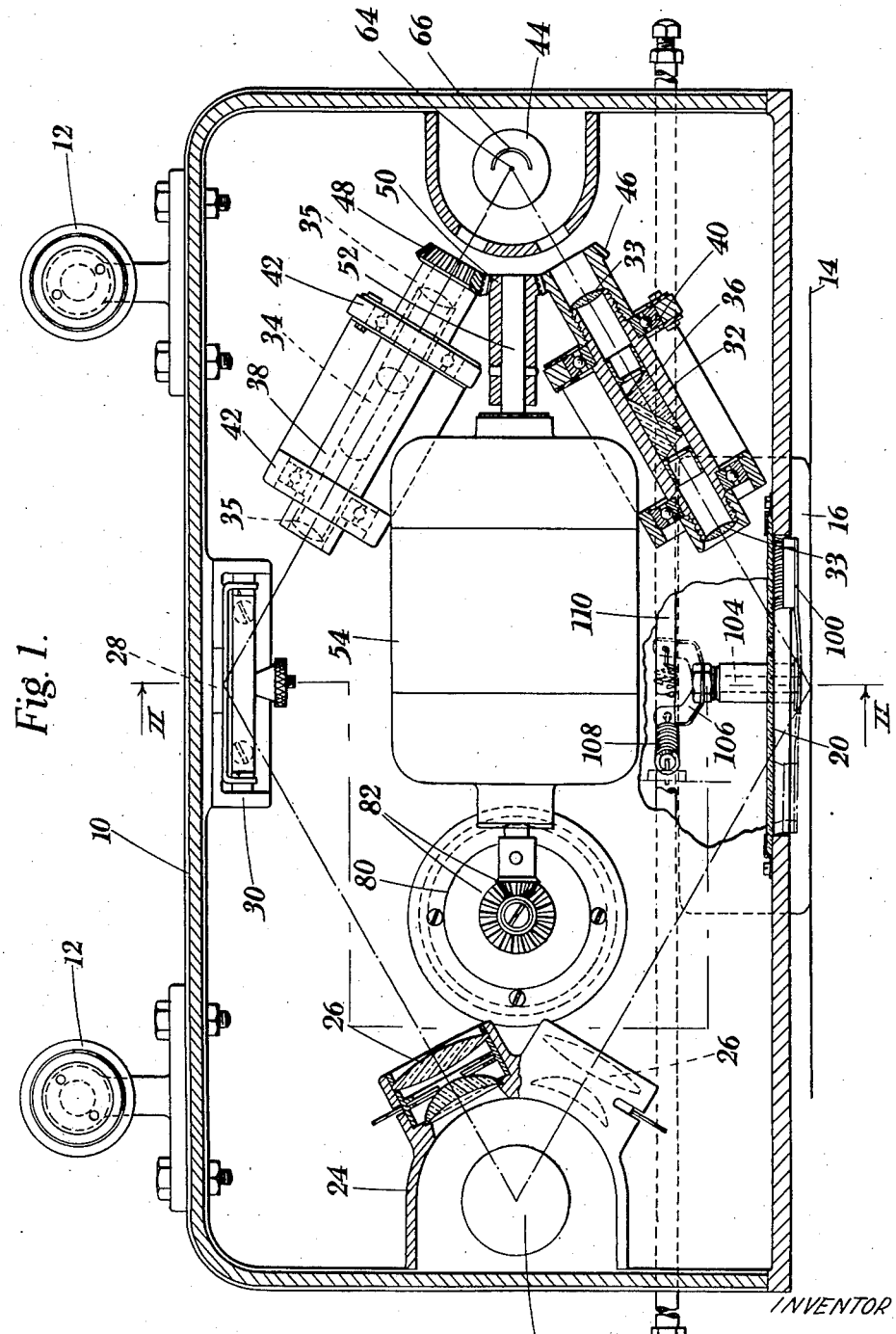

Feb. 25, 1936.  W. R. HORSFIELD  2,032,128
MEANS FOR THE MEASURING OF GLOSS
Filed May 22, 1935  3 Sheets-Sheet 1

INVENTOR
Walter Reginald Horsfield
By Franks Appleman
ATTORNEY

Feb. 25, 1936.  W. R. HORSFIELD  2,032,128
MEANS FOR THE MEASURING OF GLOSS
Filed May 22, 1935   3 Sheets-Sheet 2

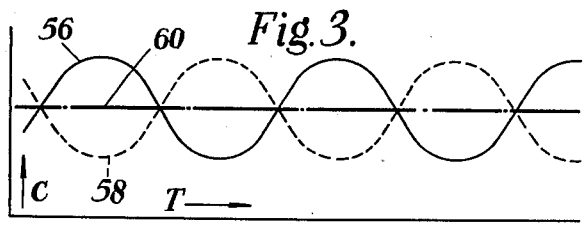
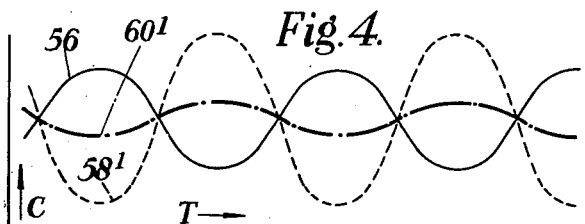
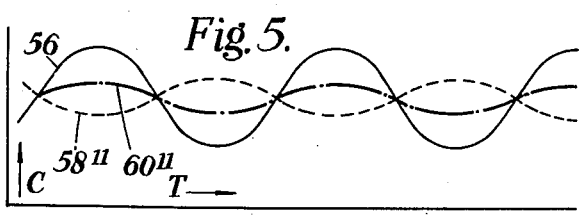
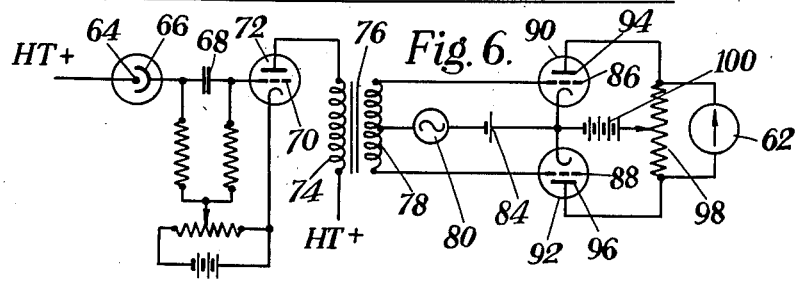

Patented Feb. 25, 1936

2,032,128

UNITED STATES PATENT OFFICE 2,032,128

MEANS FOR THE MEASURING OF GLOSS

Walter Reginald Horsfield, London, England

Application May 22, 1935, Serial No. 22,863
In Great Britain May 23, 1934

3 Claims. (Cl. 88—14)

This invention relates to the measurement of gloss, that is to say, the amount or proportion of the specular reflecting power of surfaces other than metallic surfaces. Such measurement is important in the case of paper, particularly newsprint, because the gloss furnishes an indication of the degree to which printing ink will be absorbed by the paper and therefore of the maximum speed at which printing may be carried on.

It is well known that light specularly reflected from the surface of a transparent medium is polarized in the plane of incidence of the light. Paper has an irregular surface owing to its fibrous structure and therefore most of the light that falls upon it is scattered in all directions. A smaller proportion of the light, however, is reflected in a specular manner, that is to say, the paper looks brightest when viewed at the angle of reflection. This property is what is referred to as the gloss of the paper. When the angle of incidence is equal to the angle of polarization of the material the specularly reflected light will be polarized and therefore if this light is passed through an analyzer such as a Nicol prism the amount of light transmitted through the analyzer will vary according to the angular position of the analyzer about its axis. The component of the light falling upon the paper which is scattered in a non-preferential manner will pass through the analyzer equally in all angular positions thereof.

According to the present invention an apparatus for measuring the gloss of non-metallic surfaces comprises a source of light arranged to shine upon the surface to be examined, an analyzer arranged to receive light reflected from the surface at an angle approximating to the angle of polarization, means for rotating the analyzer about its optical axis, a photo-electric cell arranged to receive the light transmitted through the analyzer, and an alternating current meter coupled to the photo-electric cell which gives a measure of the amplitude of the electrical pulsations produced in the photo-electric cell, and therefore of the amplitude of the variations in the light falling upon the cell caused by the rotating analyzer.

Preferably, a second analyzer is used which is rotated in synchronism with the first analyzer but in opposite phase relationship thereto, receives light from the same source reflected from a standard surface and directs it upon the same photo-electric cell. This causes an alternating current to be set up in the photo-electric cell, which current is the resultant of two components of opposite phase but of the same frequency. One of these components is that due to the light reflected from the standard surface and is of constant amplitude. The other is that due to the light reflected from the surface under examination, and the amplitude of this component will be greater or less according to the amount of gloss in the sample. Thus, the resultant alternating current will have different amplitudes according to the amount of gloss, this amplitude being zero when the gloss of the sample is equal to that of the standard surface. When the gloss of the sample is less than that of the standard the phase of the resultant current will be the same as the phase of the "standard" component, and when the gloss of the sample is greater than that of the standard surface the phase of the resultant current will be opposite to that of the "standard" component. In this case the alternating current meter is associated with a rectifying device so that the pointer of the meter moves in one direction when the phase is the same and in the opposite direction when the phase is opposite to that of the "standard" component.

Figure 2:
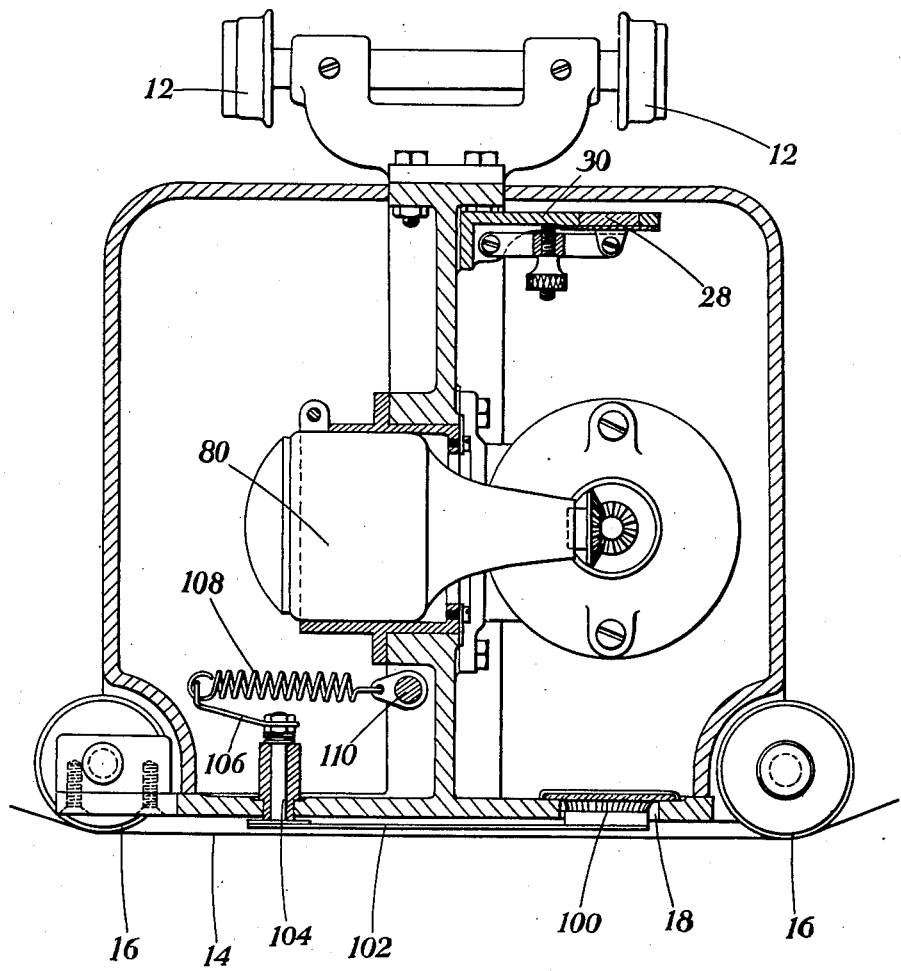

A preferred embodiment of the invention is illustrated in the accompanying drawings, in which Figure 1 is a side elevation of the apparatus partly in section, Figure 2 is a sectional end elevation of Figure 1 along the line II—II and looking in the directions of the arrows, Figures 3, 4 and 5 are diagrams illustrating the relative amplitudes of the two components of the alternating current output of the photoelectric cell under various conditions, and Figure 6 is a diagram of the amplifying and rectifying device associated with the alternating current meter.

The apparatus illustrated in Figures 1 and 2 is for use in making continuous measurements of a moving web of paper coming from a papermaking machine and it is intended to be passed continuously from side to side of the web by means which are not illustrated in the drawings. The apparatus is, however, well adapted also for the examination of small samples not only of paper but of any other material.

The apparatus is housed in a casing 10 which is suspended by rollers 12 from rails, not shown, extending transversely above the paper web which is indicated at 14 below the apparatus. At either side of the casing is a roller 16 which causes the paper to be stretched across an opening 18 in the bottom of the case which is closed by a transparent glass plate 20. At one end of the casing is an electric lamp 22 in a housing 24 provided with two condensers 26. One of these condensers projects a spot of light upon the paper 14 in the centre of the aperture 18, the angle of incidence of the light being about 57°. The other condenser projects a similar spot of light at the same angle upon a polished glass plate 28 supported in a bracket 30 in the upper part of the casing. Two Nicol prisms 32, 34 are mounted in tubes 36, 38 which are mounted to rotate in bearings 40, 42, the axes of rotation of these tubes being coincident with the axes of the beams of light reflected respectively from the paper 14 and the glass plate 28, that is to say, they are inclined at about 57° to the normals to the surfaces of the paper and of the glass plate. At the point of intersection of the two axes of rotation is a photo-electric cell 44.

The two tubes 36, 38 carry bevel wheels 46, 48 in mesh with a bevel wheel 50 on the armature shaft 52 of an electric motor 54. The bevel wheels 46, 48 have equal numbers of teeth and the Nicol prisms 32, 34 are located in their tubes so as to be always in opposite phase relation—that is to say, they are set at 90° relative to one another.

It will be apparent that the light reflected from the glass plate 28 which is polarized will pass through the Nicol prism 34 in one position thereof and will be extinguished in positions 90° from the position of transmission, and that the variations of transmission will follow a sine curve. Similarly, if the paper 14 reflects light in a specular manner the light passing through the prism 32 will also be varied in a similar manner, but the two sine curves will be opposite in phase. If the amplitudes of the variation in the two beams of light are equal the total light falling upon the photo-electric cell 44 will be constant and the photo-electric current through the cell will not vary. This condition is represented in Figure 3 in which the component of the alternating current due to the light passing through the prism 34 is represented by the continuous sine curve 56, and the component due to the light reflected from the paper is represented by the dotted sine curve 58. It is evident that the resultant of these two components is a straight line shown as a chain line 60. In Figure 4 the component due to the light reflected from the paper is of greater amplitude as indicated by the dotted sine curve 58', the current due to the light reflected from the glass plate 28 represented by 56 remaining constant in amplitude. The resultant of these two currents, represented by the sine curve 60' has an amplitude equal to the difference in amplitude of the sine curves 56, 58', and is of the same phase as the curve 58'. In Figure 5 the conditions are reversed; the current due to the light reflected from the paper is of smaller amplitude than the current reflected from the glass plate as represented by the sine curve 58'', the resultant current represented by 60'' having an amplitude which is the difference of amplitude of the curve 56, 58'' but being of opposite phase to that represented in Figure 4. It will be evident, therefore, that an alternating current meter giving an indication of the phase and amplitude of the alternating current represented by the chain line curves will give an indication of the glossiness of the paper as compared with the arbitrary standard of the polished glass plate 28. It should be noticed that the light falling upon the paper is incident upon the glass plate 20 at a point considerably displaced from the illuminated part of the paper and the light reflected from the glass plate will not enter the prism 32. Thus, this glass plate will not cause any interference with the operation of the device by reason of its polarizing capacity.

Referring now to Figure 6, the indicator is a centre-zero voltmeter 62, a positive potential is applied to the anode 64 of the photo-electric cell, and the cathode 66 is connected through a condenser 68 (which eliminates the direct component of the photo-electric current) to the grid 70 of an amplifying valve 72, the plate current of which passes through the primary 74 of a transformer 76. The centre point of the secondary winding 78 of the transformer is connected to one terminal of an alternating current generator 80 the output of which is of the same frequency as the alternating current generated in the photo-electric cell and in phase with one or other of the components thereof. This generator is shown in Figures 1 and 2 and is driven by bevel gearing 82 from the motor 54. The other terminal of the generator is connected to a bias battery 84.

The ends of the secondary windings 78 are connected respectively to the grids 86, 88 of two anode-bend rectifying valves 90, 92. The anodes 94, 96 of the rectifying valves 90, 92 are connected to opposite ends of a potentiometer resistance 98 connected across the voltmeter 62. High tension voltages are applied to the anodes 94, 96 from a battery 100 through the two branches of the potentiometer resistance 98.

Assuming first that the conditions represented in Figure 3 obtain, there will be no alternating current in the primary winding 74 of the transformer 76. The generator 80 will apply to the grids of rectifying valves 90, 92 potentials in opposite phase, with the result that there will be no reading on the voltmeter 62. Assume now that the conditions shown in Figure 4 are present and that the output from the generator 80 is such that the potential at the upper end of the winding 78 due to that generator is of the same sign as the potential at that point due to the alternating current 60'. It will be apparent that the potentials due to these two sources at the lower end of the winding will be of opposite sign. For the sake of simplicity it is assumed that these two potentials are equal. There will thus be no alternating potential applied to the grid 88, but the grid 86 will receive an alternating potential which is equal to twice that due to the alternating current 60'. There will therefore be a resultant rectified current flowing through the valve 90 which will produce a deflection in one direction of the indicating needle of the voltmeter 62. If now the conditions change to those represented in Figure 5 in which the alternating current 60'' is opposite in phase to that shown in Figure 4, the potentials at the upper end of the winding 78 will always be of opposite sign, while those at the lower end will always be of the same sign. Thus, there will be no alternating potential applied to the grid 86, while the alternating potential applied to the grid 88 will cause a rectified current to flow through the valve 92 thereby deflecting the needle of the voltmeter 62 in the opposition direction. It will further be apparent that the amount of the deflection of the needle will be different in those cases where the potentials at one end or other of the windings 78 are not equal, and thus the amount of deflection will give a measure of the amplitude of the alternating current 60 or 60'', as the case may be.

The zero of the voltmeter 62 therefore indicates equality of specular reflection between the paper and the glass plate 28, while movement of the pointer in one direction or the other indicates a smaller or a greater amount of gloss than that of the standard.

Dust from the paper 14 tends to collect on the lower surface of the glass plate 20. This dust is removed at intervals by a small brush 102 which is fixed to an arm 104 carried by a spindle 106. The upper end of this spindle within the casing carries an arm 108 connected by a tension spring 110 to a rod 112 sliding lengthwise within the casing 10 and protruding therefrom at each end. When the device is traversed from side to side of a web of paper the ends of the rod 112 strike fixed abutments which slide the rod endwise first in one direction and then in the other, the spring 110 causing the spindle 106 to turn first in one direction and then in the other thus moving the brush 102 from side to side across the glass plate 20. This action occurs at times when the apparatus is at the extreme edges of the web and therefore the interruptions in the reading of the voltmeter caused thereby are of no moment.

The photo-electric cell 44 illustrated is of the electronic type which requires a polarizing potential. When this is replaced by a photo-electric cell of the rectifier type the arrangement shown in Figure 6 can be simplified by omitting the condenser 68 and the valve 72 and passing the output from the cell directly through the primary 74. In this case also the rectifying valves 90, 92 may be replaced by copper-copper oxide rectifiers.

In Figures 3, 4 and 5 the three curves 56, 58 and 60 have the same mean height, but in general this will not be the case because a proportion of the light scattered by the paper reaches the photo-electric cell and this light is variable according to the greyness or colour of the paper. This light results in a direct component of the photo-electric current which, however, is eliminated by the arrangement shown in Figure 6.

Collimating lenses 33, 35 are mounted in the tubes 36, 38 respectively, these being so arranged that all the light that enters the tubes will pass through the Nicol prisms and will be concentrated on to the cathode 66 of the photo-electric cell.

I claim:—

1. Apparatus for measuring gloss comprising in combination a source of light arranged to shine upon a surface the gloss of which is to be measured, said surface polarizing light specularly reflected therefrom, a standard polarizing surface arranged to receive light from said source, two analyzers one adapted to receive light reflected specularly from the surface to be measured and the other adapted to receive light specularly reflected from the standard surface, means for rotating both analyzers about their optical axes in synchronism with one another, the analyzers being opposite in phase to one another, a photo-electric cell adapted to receive the light transmitted through said analyzers and an alternating current meter coupled to the photo-electric cell.

2. The combination with the subject-matter of claim 1 of an alternating current generator, means for rotating said generator in synchronism with the analyzer and in phase with that component of the alternating photo-electric current produced by one of said analyzers, an indicator, means for applying to said indicator the rectified combined outputs of the said generator and said photo-electric cell.

3. The subject-matter of claim 1 in combination with a casing enclosing the source of light, the analyzers, the rotating means therefor and the photo-electric cell, said casing being provided with means enabling it to be moved from side to side on a moving web of paper the gloss of which is to be measured and with rollers engaging said web of paper and adapted to stretch a part of said paper across an aperture in the casing through which light from said source is directed upon the paper.

WALTER REGINALD HORSFIELD.